(12) United States Patent
Noorshams et al.

(10) Patent No.: US 11,184,247 B2
(45) Date of Patent: Nov. 23, 2021

(54) WORKLOAD MANAGEMENT FOR COMPUTING CLUSTER

(71) Applicant: International Business Machines Corporation, Armonk, NY (US)

(72) Inventors: Qais Noorshams, Boeblingen (DE); Norman C. Böwing, Boeblingen (DE); Anastasiia Didkovska, Schönaich (DE); Horst Sinram, Suederbrarup (DE)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 16/033,637

(22) Filed: Jul. 12, 2018

(65) Prior Publication Data
US 2019/0386889 A1 Dec. 19, 2019

(30) Foreign Application Priority Data
Jun. 19, 2018 (EP) .................... 18178493

(51) Int. Cl.
*H04L 12/24* (2006.01)
*H04L 12/26* (2006.01)
*H04L 12/911* (2013.01)
*H04L 29/08* (2006.01)

(52) U.S. Cl.
CPC ............ *H04L 41/147* (2013.01); *H04L 43/08* (2013.01); *H04L 47/70* (2013.01); *H04L 67/10* (2013.01)

(58) Field of Classification Search
CPC .................................................. H04L 47/803
See application file for complete search history.

(56) References Cited

U.S. PATENT DOCUMENTS

| 7,039,559 B2 | 5/2006 | Froehlich et al. |
| 7,539,627 B2 | 5/2009 | Schmidt |
| 8,010,337 B2 | 8/2011 | Narayanan et al. |
| 8,056,085 B2 | 11/2011 | Kelly et al. |

(Continued)

OTHER PUBLICATIONS

Calheiros et al., "Workload Prediction Using ARIMA Model and Its Impact on Cloud Applications' QoS", IEEE Transactions on Cloud Computing, vol. 3, No. 4, Oct.-Dec. 2015, pp. 449-458.

(Continued)

*Primary Examiner* — Ario Etienne
*Assistant Examiner* — S M Z Islam
(74) *Attorney, Agent, or Firm* — Daniel J. O'Brien (57) ABSTRACT

Performance predictions in a computing cluster can be provided by sampling and storing historic workload request data of the computing cluster as time-stamped workload values, forecasting an expected total number of workload requests for a defined time interval in the future based on a time-series analysis of the time-stamped workload values, where the time-series analysis detects cyclic and repeating events in the time-stamped workload values. In response to a result of the time-series analysis, training a workload prediction model by using additional data about acyclic events in expected workload requests, where the training applies a statistical regression technique for predicting a future workload demand for the computing cluster, and in response to exceeding a predefined threshold value of the predicted future workload demand, reassigning resources of the computing cluster.

20 Claims, 8 Drawing Sheets

(56) References Cited

U.S. PATENT DOCUMENTS

| | | | |
|---|---|---|---|
| 8,838,801 B2 | 9/2014 | Alapati et al. | |
| 9,111,232 B2 | 8/2015 | Chi et al. | |
| 9,342,372 B1 | 5/2016 | Tran et al. | |
| 9,509,632 B2 | 11/2016 | Shen et al. | |
| 9,658,892 B2 | 5/2017 | Hildebrand et al. | |
| 9,703,664 B1 | 7/2017 | Alshawabkeh et al. | |
| 10,402,733 B1* | 9/2019 | Li | G06N 20/00 |
| 2011/0145366 A1* | 6/2011 | Krishnamurthy | G06F 9/52 709/219 |
| 2012/0089726 A1* | 4/2012 | Doddavula | G06F 9/5072 709/224 |
| 2012/0265881 A1* | 10/2012 | Chen | G06F 9/5061 709/226 |
| 2014/0229610 A1* | 8/2014 | Shen | G06F 9/505 709/224 |
| 2014/0281430 A1* | 9/2014 | Gschwind | G06F 9/30189 712/226 |
| 2015/0347217 A1* | 12/2015 | Biem | G06N 5/02 714/37 |
| 2017/0302738 A1 | 10/2017 | Dimnaku et al. | |
| 2017/0351511 A1* | 12/2017 | Bar-Or | G06F 8/34 |
| 2018/0121847 A1* | 5/2018 | Zhao | G06Q 10/06312 |

OTHER PUBLICATIONS

Rochert, D., "Workload Prediction using Apache Spark and R in a Mainframe Operating System", Rhine-Waal University of Applied Sciences Faculty of Communication and Environment, Master Thesis, Oct. 20, 2017, 159 pages.

Unknown, "Apache Spark", Lighning-fast unified analytics engine, printed May 31, 2018, 3 pages, https://spark.apache.org/.

Cleveland et al., "STL: A Seasonal-Trend Decomposition Procedure Based on Loess", Journal of Official Statistics, vol. 6 No. 1, 1990, 31 pages.

Unknown, "Gradient-Boosted Trees (GBTs)", https://spark.apache.org/docs/latest/ml-classification-regression.html#gradient-boosted-trees-gbts, printed May 31, 2018, 33 pages.

Rogers et al., "ABCs of z/OS System Programming vol. 11", IBM Redbooks, Dec. 2010, 270 pages.

Bensch et al., "Self-Learning Prediction System for Optimisation of Workload Management in a Mainframe Operating System", 2007, pp. 212-218.

Cortez et al., "Resource Central: Understanding and Predicting Workloads for Improved Resource Management in Large Cloud Platforms", SOSP'17, Oct. 28, 2017, 15 pages.

Noorshams et al., "Optimized Workload Management for Computing Cluster", Application No. EP18178493.5, Filed Jun. 19, 2018.

\* cited by examiner

WORKLOAD MANAGEMENT FOR COMPUTING CLUSTER

BACKGROUND

The present disclosure relates generally to performance predictions, and more specifically, to performance predictions in a computing cluster.

The IBM Z system with its z/OS® operating system offers high performance, availability, scalability, security, and real-time reaction to business opportunities and needs based on resource de-/allocation on demand. (z/OS is a registered trademark of IBM Corporation.) Capacity planning, which is required for meeting service needs, cost planning, and business demands, plays an important role in the z/OS field. Capacity planning provides information on the number of resources needed (e.g., processors, storage, etc.), the workload distribution, and consumption as well as deciding when resources need to be de-/provisioned.

SUMMARY

According to one aspect of the present disclosure, a method for performance predictions in a computing cluster can be provided. The method can comprise sampling and storing historic workload request data of the computing cluster as time-stamped workload values and forecasting an expected total number of workload requests for a defined time interval in the future based on a time-series analysis of the time-stamped workload values, where the time-series analysis detects cyclic and repeating events in the time-stamped workload values. Additionally, the method can comprise, in response to a result of the time-series analysis, training a workload prediction model by using additional data about acyclic events in expected workload requests. The training can apply a statistical regression technique for predicting a future workload demand for the computing cluster, and upon exceeding a predefined threshold value of the predicted future workload demand, reassigning resources of the computing cluster.

Furthermore, other embodiments can take the form of a related computer program product storing program instructions configured to cause a processor to perform a method similar to the method described above. Furthermore, other embodiments can take the form of a system comprising a processor and a computer-readable storage medium storing instructions executable by the processor to cause the processor to perform a method similar to the method described above.

The above Summary is not intended to illustrate each embodiment of, or every aspect of, the present disclosure.

BRIEF DESCRIPTION OF THE SEVERAL VIEWS OF THE DRAWINGS

It should be noted that embodiments of the present disclosure are described with reference to different statutory classes. In particular, some embodiments are described with reference to method type claims, whereas other embodiments are described with reference to apparatus type claims. However, a person skilled in the art can gather from the above and the following description that, unless otherwise specified, in addition to any combination of features belonging to one type of statutory class, also any combination between features relating to different statutory classes, in particular, between features of the method type claims, and features of the apparatus type claims, is considered as to be disclosed within this document.

The aspects defined above, and further aspects of the present disclosure, are apparent from the examples of embodiments to be described hereinafter and are explained with reference to the drawings, but to which the present disclosure is not limited.

Preferred embodiments of the present disclosure can be described, by way of example only, and with reference to the following drawings.

DETAILED DESCRIPTION

There is a need to do capacity planning based on recent data, or real-time data, that can help to detect a system's anomalies as well as analyze and predict the transaction rates and trends, workload resource consumption, and growth rates. Capacity planning can be exploited to improve system performance and/or efficiency, such as adding processing resources to the system or performing workload reclassification. Furthermore, it should be highlighted that inaccurate and/or imprecise analyses can lead to workload over- or under-commitment which is undesirable because it is related to both pricing and performance goals.

A motivating example from a real-world banking environment running both batch workload during night time and online transaction workload during day time and facing real-time capacity planning issues highlights the need for an automated analysis approach. An overnight batch workload needs to finish when the online workload begins in the morning. If not, the simultaneous workloads may overburden the system and prevent the banking customers from accessing their accounts. Currently, experts monitor the system environment in real-time, and if they expect their batch workload to run too long, they add additional, costly computing resources. The expert's judgement, however, is based on experience and intuition. This can lead to misinterpretation and inefficiency.

The following limitations can be observed with the traditional approaches: today, tasks for capacity planning on a Z sysplex, i.e. a cluster of Z servers, are performed manually by experts based on their experience. Meanwhile, the business demands and data to analyze are increasing dramatically. Thus, the current approach makes data analysis unfeasible and unreliable. Decisions that directly affect operations need to be made quickly to guarantee that workloads meet their goals. Wrong decisions can lead to large costs due to unsatisfied performance goals and/or wasted capacity. Typical approaches of offloading data from many systems into so-called data lakes can help for after-the-fact analysis, but fail to give suggestions at the time they are needed (e.g., when the decision of adding capacity needs to be made). Hence, the problem addressed by the present disclosure is knowing the future system and workload performance on z/OS clusters in an automated way in real-time without offloading the data off the cluster.

Some tools can assist in different types of system analyses, planning, and behavior forecasting. However, these tools have a common drawback: before the data can be analyzed and processed, it needs to be offloaded to a data lake, or some other type of storage method, that causes increased complexity, data duplication, and/or data movement, all of which can be time consuming and/or can lead to data loss.

In the context of this description, the following conventions, terms and/or expressions can be used.

The term "time-series analysis" can denote the collection of statistical approaches and algorithms and/or the process of the application thereof applied to time-series data points to obtain metrics or other information describing the time-series data points and/or to obtain models configured to forecast the time-series data points into the future, i.e., to predict unobserved future time-series data points based on the observed historic time-series data points with sufficient confidence.

The term "computing cluster" can denote a set of loosely or tightly connected computers or computing systems that work together, so that in many respects, they can be viewed as a single system. The components of a cluster can usually be connected to each other through fast local area networks, with each node (computer used as a server) running its own instance of an operating system. The operating system can, in some cases, differ from node to node. In some embodiments, all nodes use the same or similar hardware. However, embodiments exist in which the hardware differs significantly within the cluster.

The term "historic workload request data" can denote information collected, sampled, measured, and/or stored in the past about then current (i.e., in the past) workload requests. The workload request data can be time-stamped, so that the historic sequence of changing workloads can be available for further analysis.

The term "workload request" can denote addressing a request from one computer system to another computer system. There can also be internal workload requests from one process to another process or from one node in a cluster to another node.

The term "workload demand" can denote a result of one or more workload requests. The workload demand can be a measure for a load that a system or cluster is working on. The workload demand can be quantifiable, e.g., in number of transactions per time and/or a percentage of a utilization of the computer node.

The term "cyclic and repeating events" can denote events such as regular events in workloads for a computing cluster. This can reflect typical daily changes identifying peak workload hours or regular peak workload days in a week.

The term "training of a workload prediction model" can denote applying a machine learning technique based on a statistical regression method. This model can not only reflect regular and cyclic highs and lows in workload demands but also acyclic expected ups and downs in workload demands based on additional, calendar-based data, such as e.g., vacation periods, moving public holidays, or other society events influencing the computer usage. Additionally, system information about the computing cluster can be used as inputs for the training. Such additional system information can reflect planned downtimes due to maintenance of a computing node or related computing resources as well as information about system availability, such as for a portion of their computing cluster (e.g., the availability of a node and/or a CPU due to special license agreements or other contractual considerations).

The term "acyclic events" can denote known calendar-based future events like popular or planned vacation days, moving public holidays and/or other constraints influencing the usage of specific computing resources.

The term "reassigning resources" can denote releasing computing resources of a computing cluster for other purposes (i.e., other workloads or workload classes) or shutting such resources down if the expected workload shows a decreasing forecast. On the other hand, additional computing resources can be activated if the forecasting suggests an increasing demand for workloads for one or more workload classes.

The term "z/Architecture®" denotes an architecture model used by IBM for its mainframe computer system from z900 onwards. (z/Architecture is a registered trademark of IBM Corporation.) Multiple systems running the z/OS operating system can be coupled into a "Sysplex", or, with Coupling Facility connectivity, "Parallel Sysplex®". (Parallel Sysplex is a registered trademark of IBM Corporation.) A Parallel Sysplex can extend across one or more servers and can offer a single system view of multiple z/OS instances. Used for disaster recovery, Parallel Sysplex combines data sharing and parallel computing to allow a cluster of currently up to 32 systems to share a workload for high performance and high availability. This can allow authorized components in up to eight logical partitions ("LPARs") to communicate and cooperate with each other using the so-called XCF protocol.

The term "computing node" can denote, e.g., one of the computing systems being part of a Parallel Sysplex, or any other type of computing cluster.

The term "central processing unit utilization" can denote a percentage of the total capacity of a CPU (central processing unit) of a computer system. Other related measurement techniques can comprise the number of transactions (or basic transactions) per time unit.

The term "R statistical language" can denote the language and environment for statistical computing and graphics. R is based on a GNU project which is similar to the S language and environment which was developed at Bell Laboratories (formerly AT&T, now Lucent Technologies) by John Chambers and colleagues. R can be considered as a different implementation of S. R can provide a wide variety of statistical techniques (e.g., linear and nonlinear modeling, classical statistical tests, time-series analysis, classification, clustering) and visualization techniques. R provides an Open Source route to use the broad set of statistical functions.

The term "Apache Spark" can denote the general engine for large-scale computing. It can offer APIs written for Java®, Scala, Python and R. (Java is a registered trademark of Oracle Corporation.) Available on z/OS are APIs (application programming interface) for Java, Scala and Python. Apache Spark also offers a machine learning library (MLLib), which features a multitude of implemented machine learning algorithms like K-Nearest-Neighbor, Random Forest, Gradient Boosted Tree and many more. The extensive Dataframe API can provide a pipeline for machine learning ranging from feature selection, feature extraction, and feature transformation to model training and model evaluation.

Aspects of the present disclosure use the time series analysis algorithm STL—but can be replaced by other algorithms—proposed by Cleveland, Cleveland, McRae, & Terpenning (1990) that is characterized by the decomposition of a time series into the three components (i) trend component, (ii) seasonal component, and (iii) remainder. The trend component describes whether the data generally rises or falls during the observation period. The seasonal component describes the cyclical aspect of the data. Finally, the remainder describes data that cannot be explained by the previous two components.

The term "Gradient Boosted Tree" can denote a supervised machine learning algorithm using an ensemble of decision trees, which can be used for regression and classification problems. The algorithm iteratively trains decision trees by minimizing a loss function. After each iteration, the prediction can be compared to the true value leading to a re-labelling of the dataset to emphasize training on the poorest predictions. In some embodiments, the decision tree can correct previous mistakes. Aspects of the present disclosure can use the Gradient Boosted Tree algorithm built into the Apache Spark MLLib.

The term "system management facility"—in short SMF—can denote a system tool that can be used on a mainframe system as part of the z/OS operating system for collecting system parameters and workload data in a time stamped manner. The sampled data can be stored in an SMF dataset (known as a "file") on a persistent data storage system (e.g., a disk drive).

Aspects of the present disclosure can offer multiple advantages and technical effects.

Aspects of the present disclosure enable cluster computing operators, like z/OS system programmers and capacity planners, automated and robust management of their system. The present disclosure can analyze performance and workload management data originating on systems in a, e.g., z/OS sysplex, to make workload demand predictions for selected workloads using a two-operation approach comprising a time series analysis and usage of a, e.g., Gradient Boosted Tree machine learning algorithm operating on the output of the time series analysis. The concept is to prepare, clean, and filter the data on each node, e.g., z/OS system in the sysplex, and then aggregate the data for all systems in the sysplex on one system. This contrasts with current approaches, which usually offload the data to a data lake (or similar storage method/device) for further analysis. The data in question can be sensitive and confidential; thus, moving data out of the secure z/OS sysplex should be avoided. The data extraction from SMF records, as well as the preparation, cleaning, filtering, and aggregation of the extracted data can be done with Apache Spark running on at least one z/OS system in the sysplex (as the data in a sysplex is usually shared). Additional Apache Spark instances can be run for data preparation in case the SMF records are not shared in the sysplex.

Aspects of the present disclosure identify seasonal and/or trend-based patterns in the workload, which can be predicted using time series analysis. Using time series analysis, aspects of the present disclosure can predict the number of completed transactions in an equidistant reporting interval. For online workloads, the number of completed transactions is an important metric closely linked to the external demand that reaches each system in a sysplex. Other factors, such as system performance limits, are specifically excluded and can be considered in a following operation. The predicted number of completed transactions can then be one input feature for the, e.g., Gradient Boosted Tree algorithm, which can further incorporate other features like calendaring aspects, constraints, or system information (e.g. number of processors in the system). Calendaring can be important due to the workload requests for transactional workloads being dependent on features like the day of the week or the fact that a given day is a holiday. A constraint could, e.g., be the available system and/or cluster capacity. The result of the Gradient Boosted Tree can be a per-workload prediction of future workload demand for a given timeframe using a CPU utilization metric. Benefits of the present disclosure can range from enablement of automatic system anomaly detection to automatic capacity planning. Both scenarios can also benefit from additional robustness due to the prediction being traceable given the input data, while in traditional approaches both system, anomaly detection, and capacity planning are in practice often done manually by experts. Notably, all the aforementioned advantages are realized while avoiding offloading data outside of the secure Z environment. The solution presented is highly flexible and the machine learning algorithm as well as the specific algorithm used for the time series analysis could be exchanged.

In the following section, additional embodiments of the present disclosure are described.

According to some embodiments, the computing cluster can be a z/Architecture based computing system. Due to its comparably high complexity related to its high centralized performance and usage in large enterprises, performance predictions can be instrumental in managing cost and performance requirements for such systems. However, the present disclosure is not limited to z/Architecture computing system clusters. It can be applicable to a large variety of different computing systems.

According to some embodiments, the additional data can also comprise additional system information. Such system information can be data about an availability of resources at a given point in time, e.g., due to planned maintenance and/or a disconnect, e.g., of a node due to licensing conditions. Thus, also known information about the future of the cluster computing system and its individual node and its related resources can be taken into account for building the workload prediction model.

According to some embodiments, the computing cluster can comprise a plurality of computing nodes. As an advantageous feature of clustered computer systems, the nodes and other components can be activatable or set in a deactivated mode on demand so that performance changes can be addressed elegantly.

According to some embodiments, one node of the computing cluster can perform the time series analysis and perform the training for all other nodes of the computing cluster. Thus, one of the nodes can act as a master whereas the other nodes of the cluster can be configured to operate in a slave mode for the purpose of workload demand predictions. This can save compute resources and limit the workload requirements for the workload demand computing to a minimum.

According to some embodiments, a workload request can be characterized by classes of workload. These different types of workloads—e.g., interactive dialog or online transactions or batch jobs—can easily be differentiated. Different classes can have different types of CPU utilization and/or transaction requirements. This way the workload's real demand with respect to the computing resources can be better categorized.

According to some embodiments, the workload request can be proportional to a number of transactions. In some embodiments, the workload demand can be proportional to CPU utilization. Thus, different measurement criteria can be used to characterize a workload and/or a future demand. In some embodiments, the input and output of the time series analysis can be done in units of "transactions per time". This can also be the unit for the input of the regression model. The output of the regression model can be done in utilization per time. However, the units may not necessarily be different. They can either be transactions per time or utilization per time for all input/output purposes. This can also improve usability (e.g., more comprehensible/intuitive) for an operator.

According to some embodiments, the statistical regression technique can be based on the R statistical language. I.e., one node of the computing cluster can execute a method of the statistical regression technique and the other nodes can use the results. If, e.g., an implementation—i.e., an interpreter—of the R statistical language can be available under one specific operating system, this can be used to access the R statistical language functions on one of the nodes of the computing cluster while other nodes can run another operating system not compatible with the R statistical language implementation.

Furthermore, the time series analysis can be based on statistical tools available in R. Having both core parts of the method—i.e., the time series analysis and the building the workload model also reflecting the expected acyclic events—can also have efficiency advantages.

According to some embodiments, the statistical regression technique is used within the computing cluster. I.e., no down-loading or uploading to or from another computer system and/or a data-lake can be required. All historic performance data can be handled within the same computing cluster. This can reduce data transmission—i.e., due to down times of network or external computing resources—and it can also save system resources making the complete method more reliable in a RAS sense (reliability, availability, service-ability).

In the following, a detailed description of the figures can be given. All instructions in the figures are schematic. Firstly, a block diagram of an example method for performance predictions in a computing cluster is given. Afterwards, further embodiments, as well as embodiments of the system for performance predictions in a computing cluster, are described.

Figure 1:
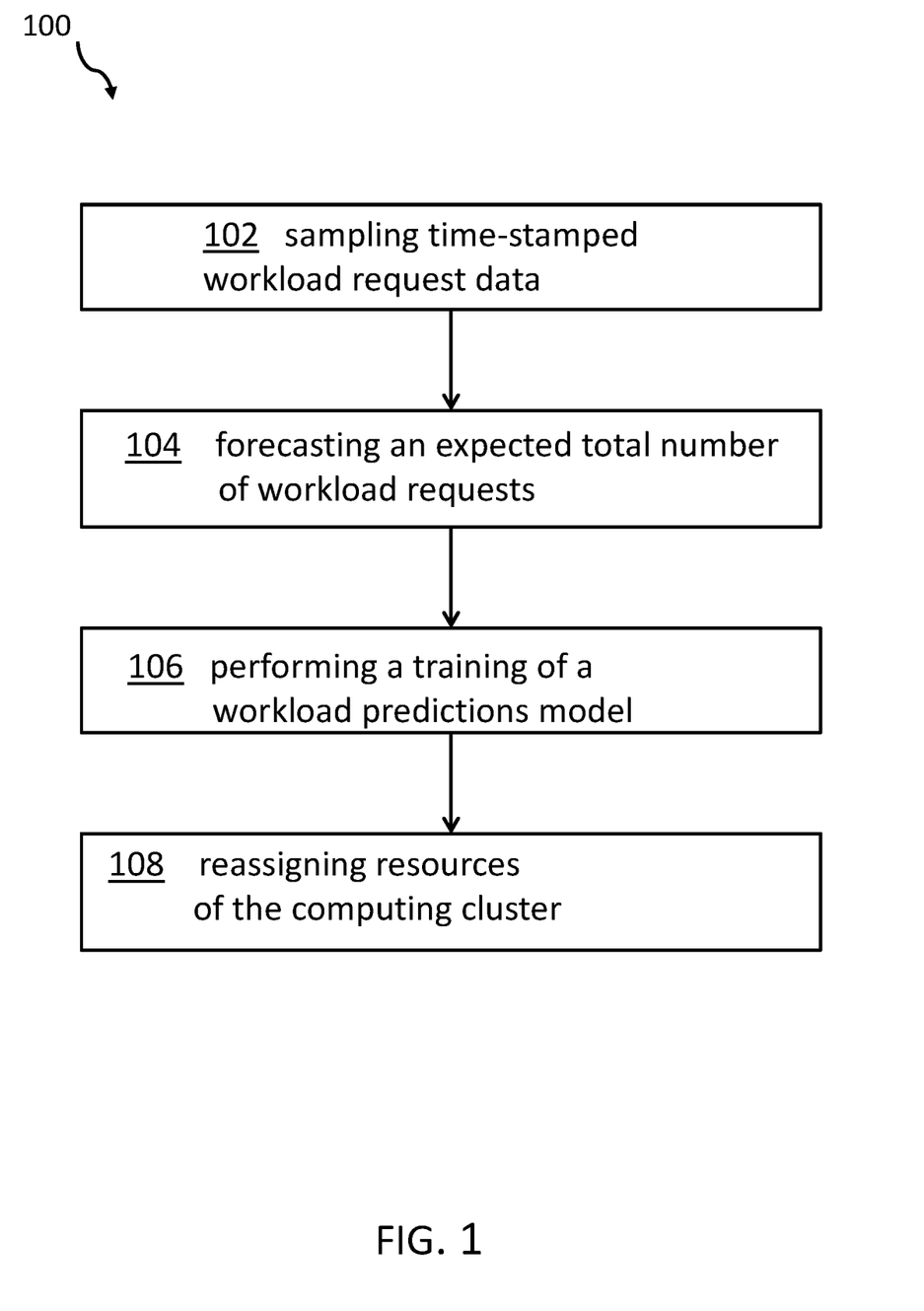
FIG. 1 shows a block diagram of a flowchart illustrating an example method for generating performance predictions in a computing cluster, in accordance with some embodiments of the present disclosure.

FIG. 1 shows a block diagram of a method 100 for generating and applying performance predictions in a computing cluster. The method 100 comprises sampling and storing, 102, historic workload request data of the computing cluster as time-stamped workload values, typically performed by the SMF.

Additionally, the method 100 comprises forecasting, 104, an expected total number—e.g., the sum—of workload requests for a defined time interval (which can theoretically be unlimited) in the future based on a time-series analysis of the time-stamped workload values. The time-series analysis detects cyclic and repeating events in the time-stamped workload values.

Moreover, the method 100 comprises, in response to a result of the time-series analysis performing, 106 a training of a workload prediction model by using additional data about acyclic events (e.g., based on known calendar related events in expected workload requests) as well as additional system information. The training applies a statistical regression technique for predicting a future workload demand for the computing cluster. The statistical regression technique applied can be, e.g., the Gradient Boosted Tree algorithm built into the Apache Spark MLLib.

Finally, the method 100 comprises, upon exceeding a predefined threshold value of the predicted future workload demand, reassigning, 108, resources of the computing cluster.

Figure 2:
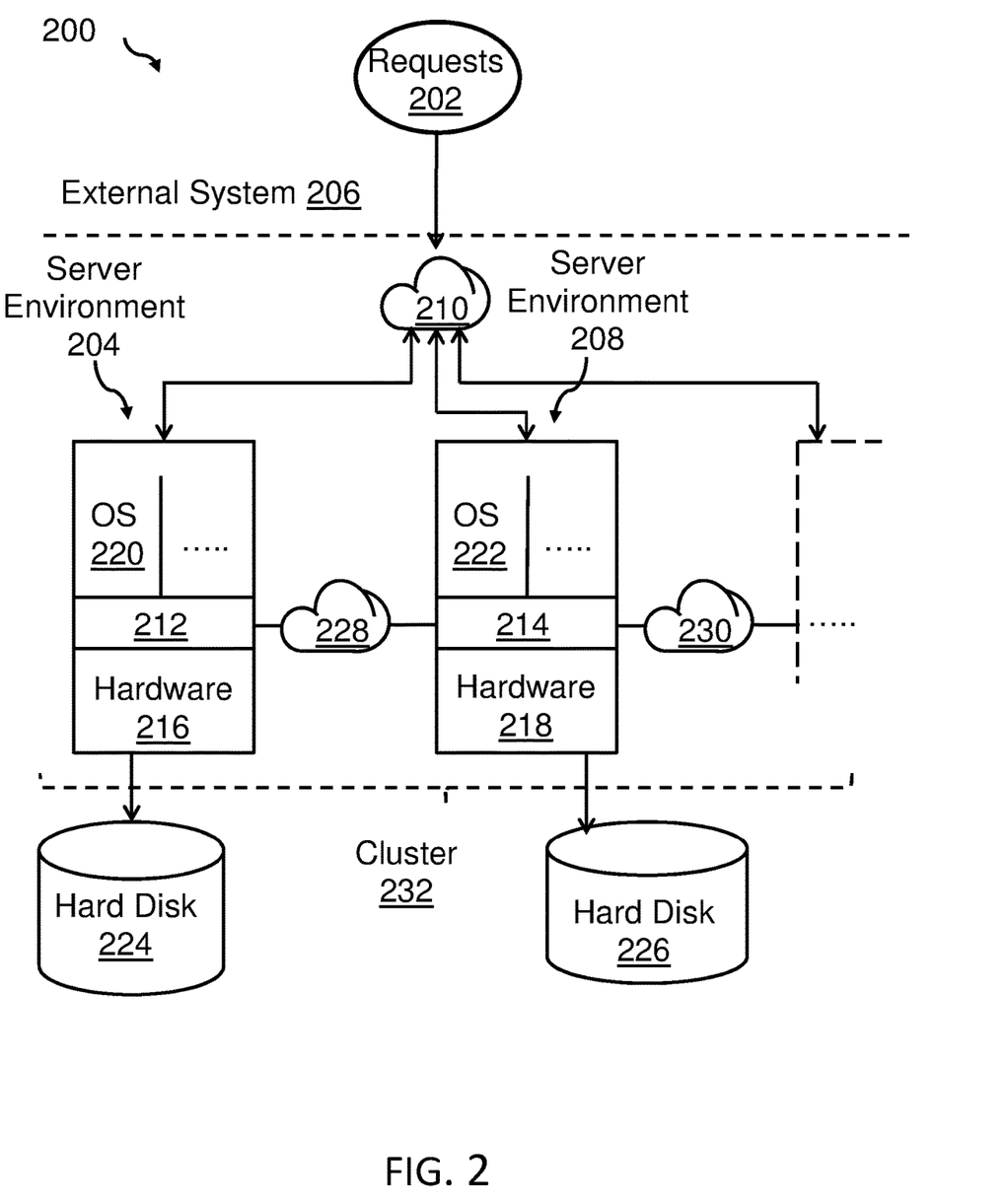
FIG. 2 shows a block diagram of an example computing cluster, in accordance with some embodiments of the present disclosure.
Figure 3:
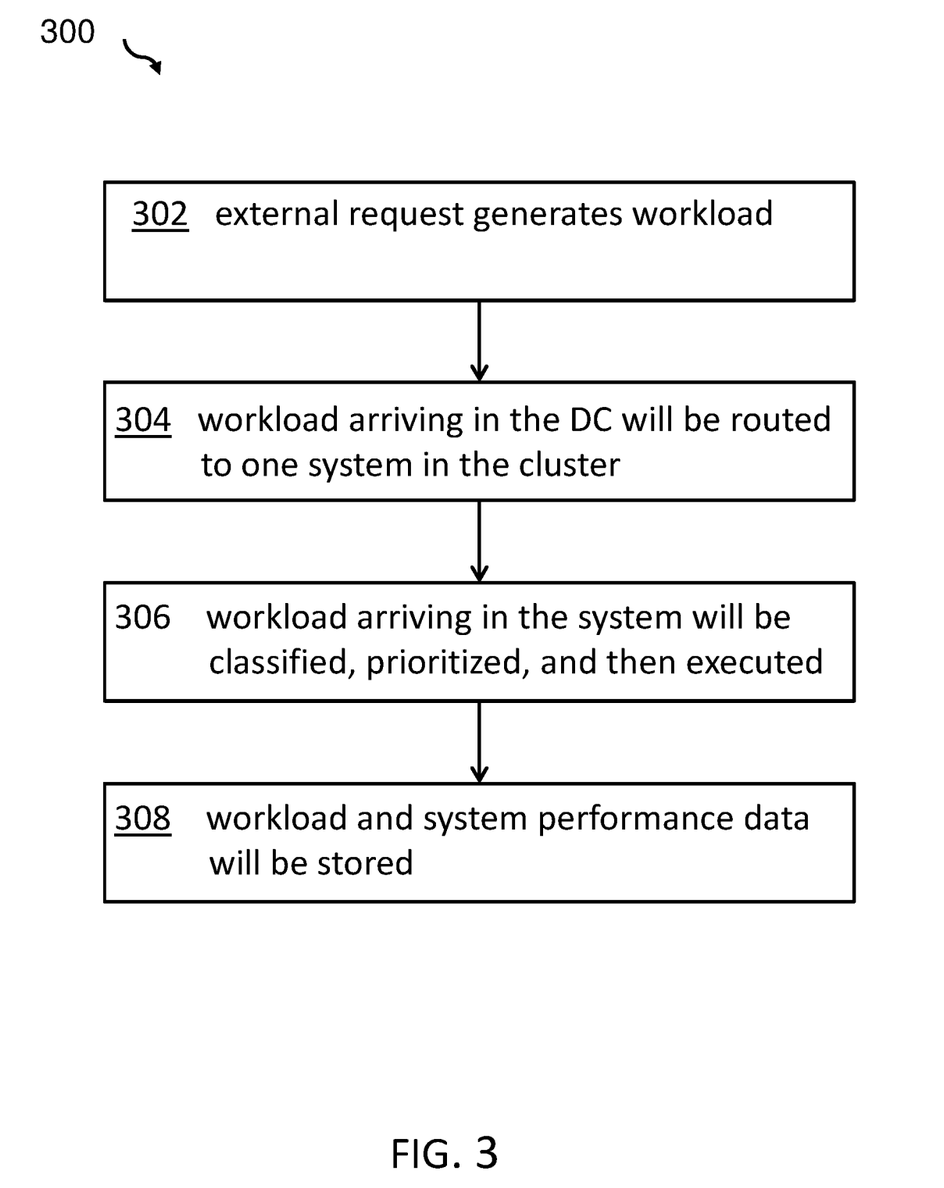
FIG. 3 shows a block diagram of a flowchart illustrating an example method for workload data sampling, in accordance with some embodiments of the present disclosure.

FIG. 2 shows a block diagram of a typical architecture 200 of a computing cluster 232 in a Z system, while an example method 300 to handle workload requests is detailed in FIG. 3. An external system 206 outside the cluster 232 can send requests 202 to the cluster 232 (e.g., in a banking environment by using the ATM (automated teller machine) for money withdrawal) which generates workloads to the server environment 204, 208, . . . implemented as the cluster 232. If a request arrives at the data center, it is routed to one of the server nodes 204, 208, . . . within the cluster 232, typically via network 210. The server nodes 204, 208 are usually virtualized using a virtualization layer 212, 214 atop the hardware 216, 218 and can host multiple operating systems 220, 222. On arrival of the request to one of the nodes 204, 208 it can be classified by its type, it can be prioritized, and then it can be processed by an application of one of the operating systems environments 220, 222. During and after the processing of the request, the workload and system performance data can be stored in long term storage, e.g., a hard disk 224, 226, e.g., for post-processing, e.g., for charging and pricing purposes. The data is usually shared between all systems in the sysplex, but there can be separate data stores as well. Furthermore, this data can be evaluated by a system administrator for capacity planning and after-the-fact analysis. The virtualization layers can also be connected via a network 228, 230.

With reference to the method 300 of FIG. 3, the workload request generates a workload, 302. The workload arriving in the data center can be routed, 304, to the system in the cluster. The workload arriving in the system can be classified, prioritized, and then executed, 306. The workload and system performance can be stored on persistent long-term storage, 308. This can be handled by the SMF.

Figure 4:
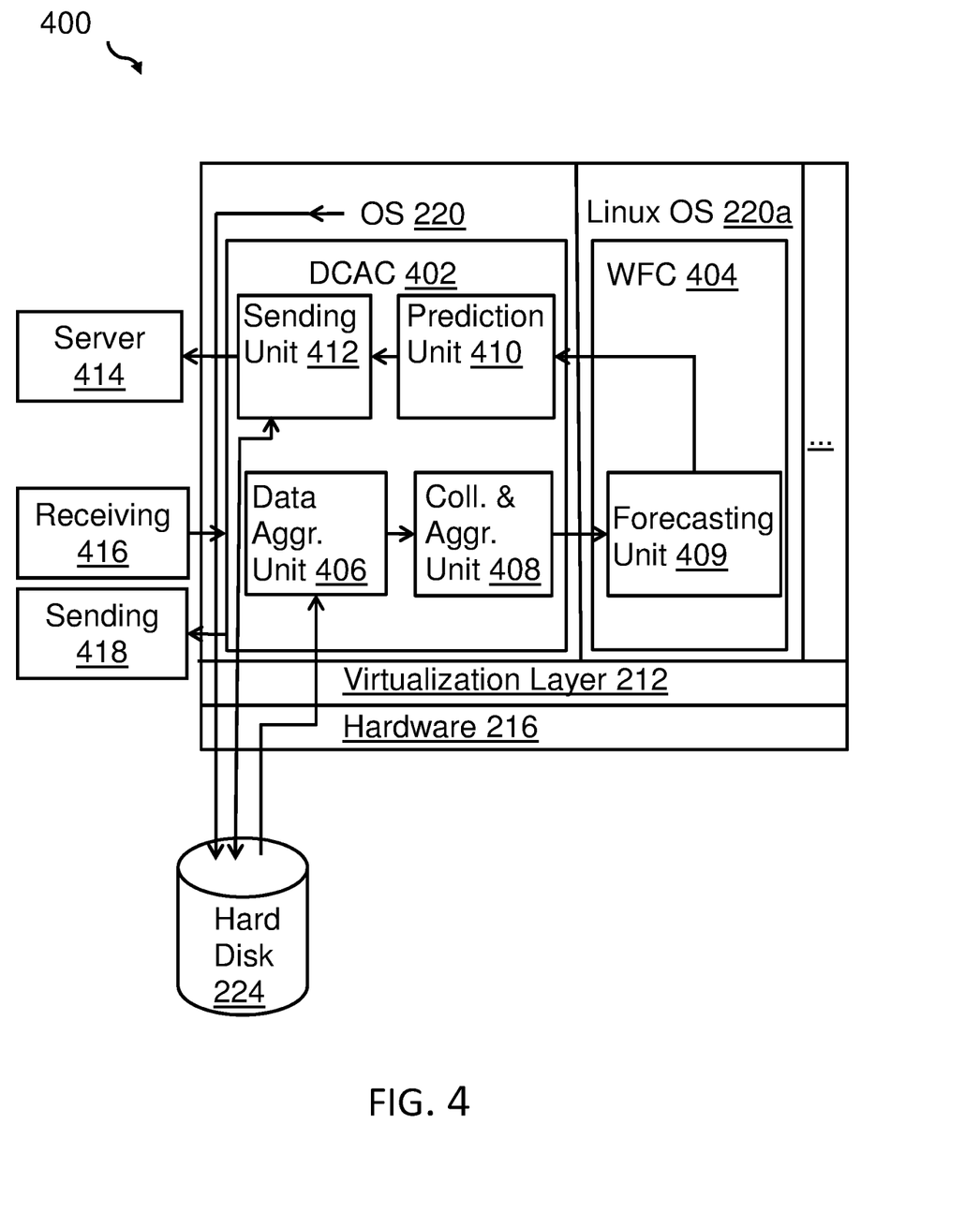
FIG. 4 shows a block diagram of a node of a computing cluster, in accordance with some embodiments of the present disclosure.

FIG. 4 shows a block diagram of an example computing node 400 of a computing cluster (e.g., FIG. 2).

The proposed architecture, shown in FIG. 4, introduces at least two new components: the data collection and analysis component (DCAC) 402 and the workload forecasting component (WFC) 404, to automate the data processing and performance prediction enabling the proactive management of the system environment.

The DCAC 402 is introduced for every system in the cluster that is running the workload to be analyzed. Only one DCAC 402, however, runs as a master and orchestrates the process. The other DCACs 402 run as slaves. Furthermore, only one WFC 404—potentially implemented in R—is needed per cluster. The WFC 404 can be included into the master DCAC 402. The benefits of having it possibly separated are (i) possibly synchronous as well as asynchronous workload forecasting, (ii) possibly using a dedicated analytics machine, and (iii) possibly integrating existing algorithms as an extension point.

The WFC 404 can be executed in a Linux operating system environment 220a, whereas the other components can run under, e.g., z/OS, namely, the data aggregation unit 406 for an aggregation of relevant data (receiving, 416, in case of the master system; sending, 418, in case of a slave system) from systems (e.g., over workload classes), the data collection and aggregation unit 408 for collecting and aggregating cluster data (if the analysis component is the master), the forecasting unit 409, the performance modeling and prediction unit 410 and the sending unit 412 for sending the results to act proactively to other servers 414 and/or for possibly (re-)adjusting and/or (re-)configuring nodes in the cluster.

Figure 5:
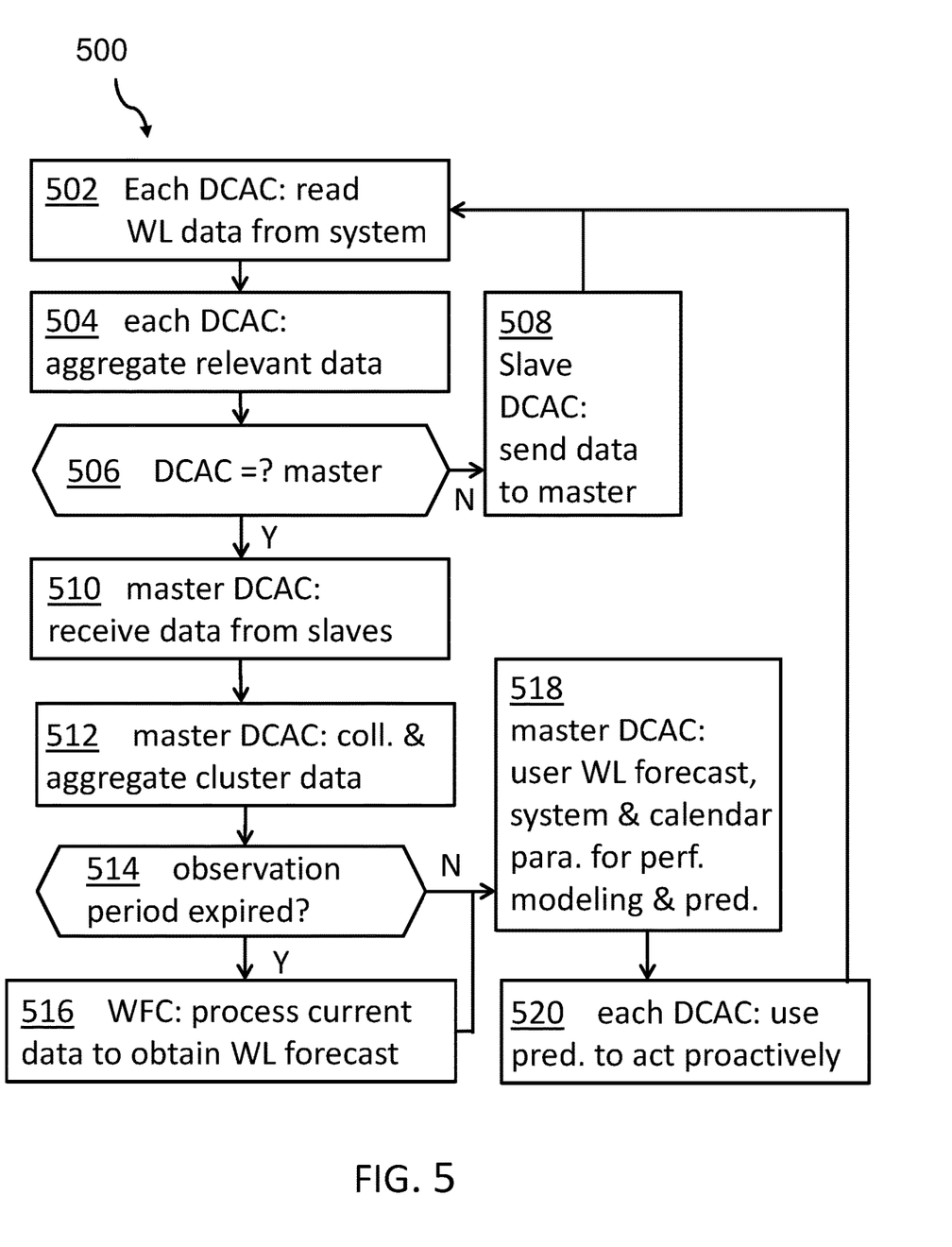
FIG. 5 shows a flowchart of an example method for generating performance predictions, in accordance with some embodiments of the present disclosure.

It can be noted that each DCAC 402 and the cluster reads the workload data from disk continuously. They then aggregate the data (FIG. 4/406; FIG. 5/504), e.g., over workload classes, and either send the aggregated data to the master DCAC 402 or collect the data from the other systems in the cluster—were there can possibly zero or more other systems—if it is the master DCAC. The master DCAC 402 collects the data from the slaves and aggregates them to obtain a holistic view of the environment (FIG. 4/408; FIG. 5/512).

The process 500 for working with the data is shown in FIG. 5. Each DCAC in the cluster reads, 502, the workload data from disk (e.g., FIGS. 2, 4; 224) continuously. They then aggregate, 504, the data by the data aggregation unit 406, e.g., over workload classes, and either send, 508, the aggregated data to the master (e.g., 506) if it is a slave DCAC 402 or collects/receives, 510, (e.g., 416 in FIG. 4) the data from the other systems in the cluster—where there can be possible zero or more of other systems—if it is the master DCAC 402. The master DCAC 402 collects, 512, the data from the slaves and aggregates them to obtain a holistic view of the environment (by the data collection and aggregation unit 408). The workload forecasting is required in intervals, e.g., every day (other forecasting periods are possible), depending on the horizon of the forecast.

If the observation period is expired—case "yes" of the determination 514 whether the forecast period is expired—a new forecast with fresh data is needed (operation 516: WFC: process current data and obtain workload forecast), the information is forwarded to the WFC 404 to process and forecast (516 by the forecasting unit 409). The current forecast in combination with important system and calendar data, such as system configuration and regional/public holiday information, is used in the DCAC 404 and the respective prediction unit 410 to obtain a performance model (operation 518). Solving the performance model (e.g., the gradient boosted trees) allows predicting the system and workload performance in the future. This information is then used, 520, to proactively manage the environment (compare also sending unit 412), e.g., by adding processing resources if important workloads are expected to underperform or by removing processing resources to save money.

For example, if a utilization that requires 10 CPUs to be processed is expected for the next peak period on a node in the cluster, but only 9 CPUs are currently granted to that node, a scheduled policy can be generated in form of an XML file. That XML file is used by, e.g., a Capacity Provisioning Manager (CPM) or similar automated capacity provisioning products to add the required CPU on demand during the expected peak period. As an alternative, if adding resources is too expensive, the specific workload on the cluster can be given a higher priority in form of an importance factor in the respective Workload Manager (WLM) policy or similar server workload manager products of that node. While this can help important workloads to meet their performance goals, the consequence is that the relative priority of other workloads can be decreased.

Figure 6:
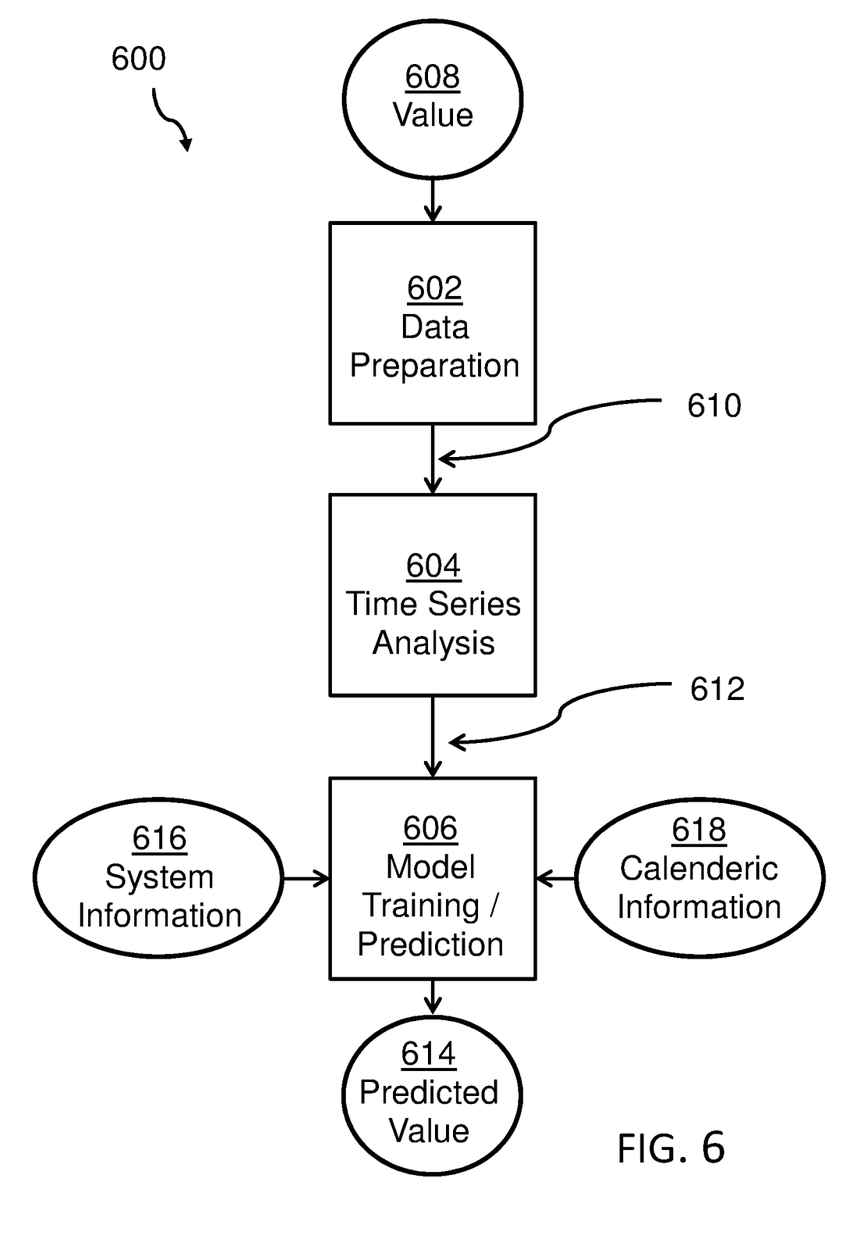
FIG. 6 shows a block diagram of a flowchart illustrating three example stages for generating performance predictions, in accordance with some embodiments of the present disclosure.

FIG. 6 shows a block diagram 600 of different stages and a related dataflow. Aspects of the present disclosure comprise three stages as shown in FIG. 6: data preparation 602, time series analysis 604, and model training/model prediction 606. Data preparation and model training/prediction 606 can be implemented in Scala using the Apache Spark Scala API. The time series analysis can be implemented in R. The data preparation stage can comprise reading workload data (e.g., 502), data aggregation (e.g., 504), possible data transfer (e.g., 508/510), and data collection and aggregation (e.g., 512), as shown in FIG. 5. The time series analysis is part of the Workload Forecasting component (e.g., 409) and as shown in FIG. 5 (e.g., 516). The performance modeling and prediction (e.g., 518) and usage of the results (e.g., 520) belong to the model training/model prediction stage.

Thus, the DCAC 402 receives a measured transactions per time value 608 and outputs a cleared/aggregated transaction per time value 610. The WFC performing the time series analysis 604 outputs a first forecast 612 as a transaction per time value which is received by the DCAC 402. As additional inputs, the DCAC 402 receives system information 616 (e.g., the number of available processors in a given time period) and calendric information 618 (e.g., public holidays) in order to generate one or more predicted utilization/time values 614.

An exemplary implementation consists of these three stages, which can be asynchronously called. This means after the data aggregation (e.g., 406, 504) on an SMF dataset has finished it is determined whether the system is running as a DCAC slave or a DCAC master (e.g., 506). DCAC slaves can send their aggregated data to the DCAC master, which can then collect and further aggregate the data (e.g., 512). The DCAC master can then send the prepared data from the z/OS sysplex 220 to the WFC 404/forecasting unit 409 which can run the time series analysis. The output of the time series analysis is then asynchronously transferred back to the DCAC master 402, which uses it as input for, e.g., the Gradient Boosted Tree algorithm for modeling and prediction (e.g., 410, 412; 518).

Another possibility for an implementation is a synchronous transfer of results between the different components (WFC 404, DCAC 402). This can either be achieved (i) with the here presented algorithms Apache Spark on z/OS supporting R as a language, (ii) if a time series analysis algorithm implemented in either Java, Scala or Python is used, which would eliminate the need to transfer data to the WFC 404, or (iii) if the data between WFC 404 and DCAC 402 is exchanged via "printing to"—in the sense of sending—and reading from system out (console)—in the sense of receiving.

Aspects of the present disclosure satisfy the use case of capacity planning, since the prediction can only be run on demand and no constant update of the predictions needs to be made.

The next section can describe the data preparation by the DCAC 402 in more detail. The data preparation stage of the DCAC is, e.g., written in Scala and uses the Apache Spark Scala API and the MDSS (mainframe data service for Apache Spark) offered by, e.g., Rocket Software. Using the MDSS, one can directly ingest SMF datasets residing on z/OS, as well as ingest SMF log-stream data currently being written on the z/OS system that the forecasting application is running on. The SMF dataset can be ingested and read into a Spark Dataframe, which can be used for data preparation. This includes dropping irrelevant columns as well as feature extraction. Feature extraction creates new columns that are easier to ingest in a machine learning algorithm and can yield additional insight. I.e., the existing timestamp, provided in the SMF record, is converted to separate "date", "time", "weekday" columns that can be of importance for model training, because "time" and "weekday" are highly relevant features for workloads with a seasonal pattern. Other features like "end_of_month", "end_of_quarter" or "end_of_year" could also be extracted into a column as well if they are of value given the specific use case. The column selection and feature extraction of "date" and "time" is shown in the example code snippet below:

```
val combinedData = data.join(dataSCS).where(data("CHILD_KEY") ===
dataSCS("PARENT_KEY"))
    .join(dataWS).where(data("CHILD_KEY") ===
dataWS("PARENT_KEY"))
val selectedData = combnedData.selection(col("SMF_TIME"),
    col("R723CRCP")alias("Trx.Comp"),
    col("R723TSUCP"),
    col("R723MCNM").alias("ServCls"),
    col("SMF723SID").alias("SID"),
    col("SMF723INT"),
    col("R723MCPU"))
val data =data_format(col("SMF_TIME"),"MM/dd/yy")
val time =data_format(col("SMF_TIME"),"HH/mm/ss")
```

Another operation of the data preparation is to clean the data. The time series analysis in the WFC implicitly operates on equidistant values. That means aspects of the present disclosure ensure that data contains the correct amount of values and that these values were taken at the appropriate time. Missing a value can be corrected by adding a dummy record for it. Having a value too large can be corrected by combining it with another value to gain meaningful insight from the time series analysis.

The next section can describe the data preparation by the WFC 404 in more detail. The time series analysis and workload forecast is based on the STL (Seasonal and Trend decomposition using Loess//locally weighted regression) algorithm and implemented in R as shown in the code snippet below. First, the relevant data can be combined and transformed into a time series, an equidistant set of data points. Additionally, the length of the frequency, i.e., the length of the periods of the cyclical pattern, is given as input. In the next operation, the data is decomposed using the STL algorithm into its trend, seasonal (i.e. cyclical) and remainder parts. Finally, the decomposition is used to obtain a forecast for the future, for example for the next period. The example code snippet below can illustrate the aforementioned:

```
# System constants
WL_ServCls = "'IMS"
SYSTEM = "'"
FORECAST_METRIC = "Trx.Comp"
# Create time series from data (evaluation constants in
UPPERCASE)
dts = ts(data[SID %like% SYSTEM & SerVC1S %like% WL_ServCls &
Time <
    LOWER_BOUND_TIME ,
    sum(get(FORECAST_METRIC)), by=list(Time)][,V1], frequency =
    PERIOD)
# Create STL decomposition and forecast
d_comp <- stl(dts,s.window="per",robust="TRUE");
fore = forecast(d_comp, h = PERIOD);
```

The next section describes the data preparation of the DCAC in more detail. The DCAC can use a Gradient Boosted Tree algorithm, which is part of the Apache Spark machine learning library as a model for the performance prediction. Input for our proposed example implementation are the time, the day of the week and the number of completed transactions in the reporting interval ("time", "weekday", "Trx.Comp"). With this input, aspects of the present disclosure can predict the CPU utilization of the given workload, which in this case is "TrxCPUPc" (Transaction CPU utilization) but can be different given another workload (not every workload reports its utilization in TrxCPUPc). For model training, aspects of the present disclosure can first transform the weekday into a numeric value "weekdayx" and then combine the numeric columns "time", "weekdayx" and "Trx.Comp" into a single vector, which can be scaled to have unit standard deviation for better model training. Some embodiments use the "Trx.Comp" predicted by the time series analysis for training and not the original captured values to be able to correct for effects the time series analysis is unable to model, i.e. the occurrence of a holiday. Given that a model has been trained and built, one can now predict values for a given input. The example code snippet below shows feature transformation, scaling, model training, and prediction of test data for model validation:

```
val featureIndexer = new StringIndexer( )
•setInputCol("weekday")
•setOutputCol("weekdayx")
•fit(trainingData)
//we define the assembler to collect the columns into a new
column //with a single vector - "features"
val assembler = new VectorAssembler( )
•setInputCols(Array("time", "weekdayx", "sum(Trx.Comp)"))
•setOutputCol("features")
val scaler = new StandardScaler( )
•setInputCol("features")
•setOutputCol("scaledFeatures")
// Train a GBT model.
val gbt = new GBTRegressor()
•setLabelCol("sum(TrxCPUPc)")
•setFeaturesCol("scaledFeatures")
•setMaxBins(100)
•setMaxDepth(8)
•setSubsamplingRate(0.8)
•setPredictionCol("Predicted: sum(TrxCPUPc)")
•setMaxIter(175)
// Chain indexer and GBT in a Pipeline.
val pipeline = new Pipeline()
•setStages(Array(featureIndexer, assembler, scaler, gbt))
// Train model. This also runs the indexer.
val model = pipeline.fit(trainingData)
// Make predictions.
val predictions = model.transform(testData)
```

Figure 7:
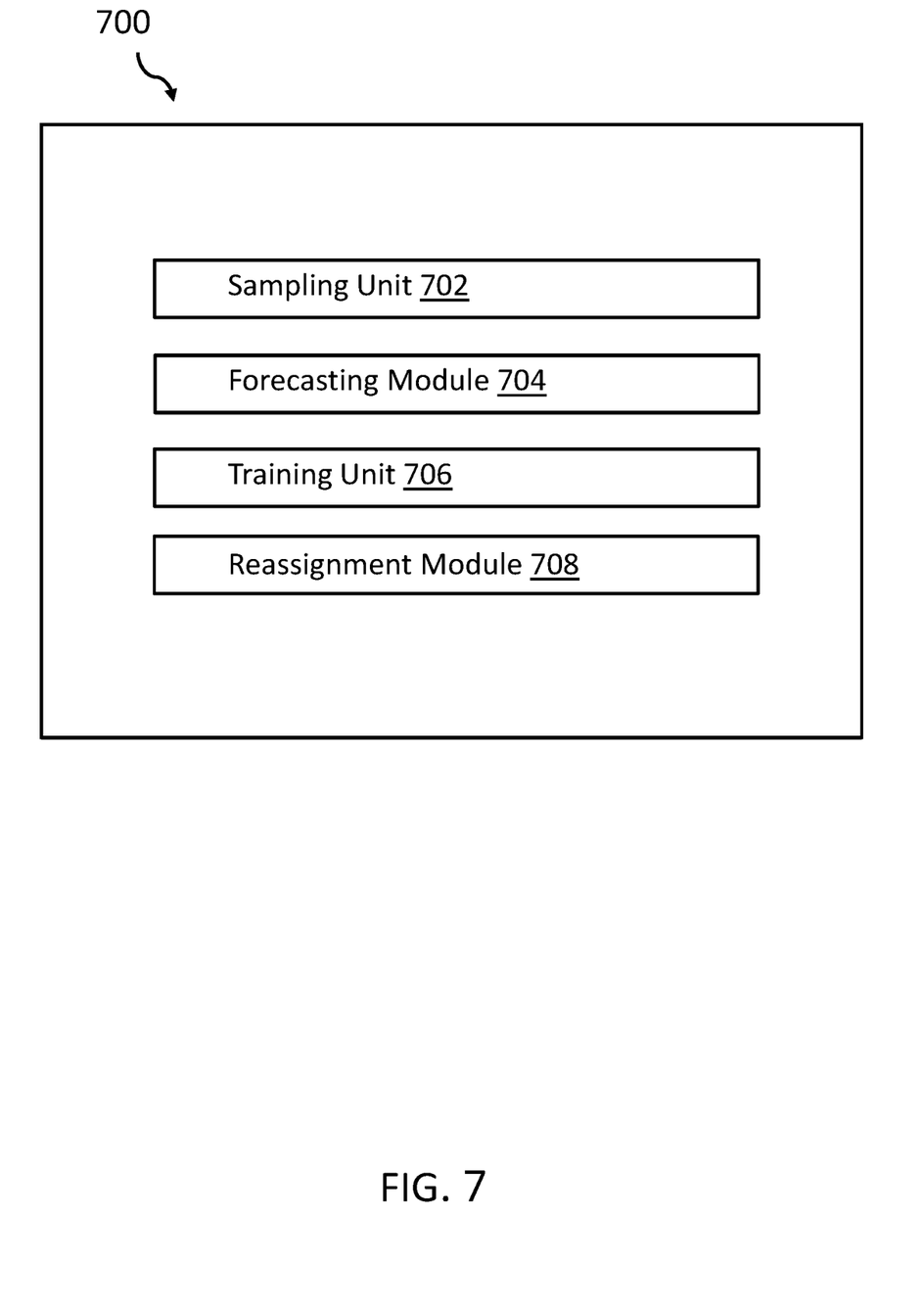
FIG. 7 shows a block diagram of an example system for generating performance predictions in a computing cluster, in accordance with some embodiments of the present disclosure.

FIG. 7 shows a simplified block diagram of the system 700 for performance predictions in a computing cluster. The system 700 comprises a sampling unit 702 adapted for sampling and storing historic workload request data of the computing cluster as time-stamped workload values, a forecasting module 704 adapted for an expected total number of workload requests for a defined time interval in the future based on a time-series analysis of the time-stamped workload values, where the time-series analysis detects cyclic and repeating events in the time-stamped workload values, and a training unit 706 adapted for, in response to a result of the time-series analysis, performing a training of a workload prediction model by using additional data about acyclic events in expected workload requests, where the training applies a statistical regression technique for predicting a future workload demand for the computing cluster. Moreover, the system 700 comprises a reassignment module 708 adapted for reassigning resources of the computing cluster if a predefined threshold value of the predicted future workload demand is exceeded.

Figure 8:
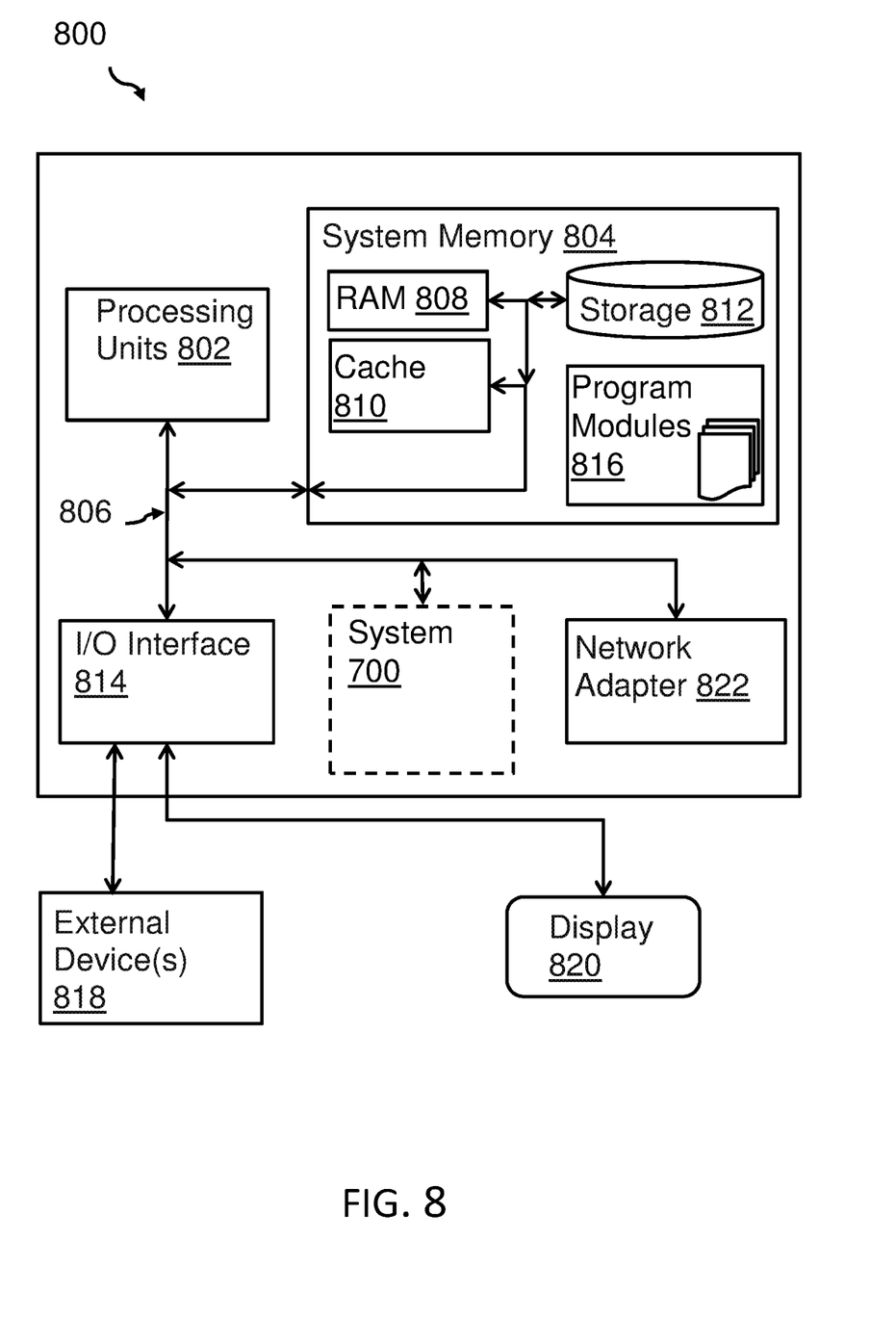
FIG. 8 shows a block diagram of an example computing system for one of the nodes of the computing cluster, in accordance with some embodiments of the present disclosure.

Embodiments of the present disclosure can be implemented together with virtually any type of computer, regardless of the platform being suitable for storing and/or executing program code. FIG. 8 shows, as an example, a computing system 800 suitable as a basis for the computing cluster and for executing program code related to the proposed method.

The computing system 800 is only one example of a suitable computer system, and is not intended to suggest any limitation as to the scope of use or functionality of embodiments of the present disclosure described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that can be suitable for use with computer system/server 800 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 can be described in the general context of computer system-executable instructions, such as program modules, being executed by a computer system 800. Generally, program modules can include routines, programs, objects, components, logic, data structures, and so on that perform particular tasks or implement particular abstract data types. Computer system/server 800 can be practiced in distributed cloud computing environments where tasks are performed by remote processing devices that are linked through a communications network. In a distributed cloud computing environment, program modules can be located in both local and remote computer system storage media, including memory storage devices.

As shown in the figure, computer system/server 800 is shown in the form of a general-purpose computing device. The components of computer system/server 800 can include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media can be any available media that is accessible by computer system/server 800, and it includes both volatile and non-volatile media, removable and non-removable media.

The system memory 804 can include computer system readable media in the form of volatile memory, such as random access memory (RAM) 808 and/or cache memory 810. Computer system/server 800 can further include other removable/non-removable, volatile/non-volatile computer system storage media. By way of example only, a storage system 812 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 806 by one or more data media interfaces. As can be further depicted and described below, memory 804 can include at least one program product having a set (e.g., at least one) of program modules that are configured to carry out the functions of embodiments of the present disclosure.

The program/utility, having a set (at least one) of program modules 816, can be stored in memory 804 by way of example, and not limiting, as well as an operating system, one or more application programs, other program modules, and program data. Each of the operating systems, one or more application programs, other program modules, and program data or some combination thereof, can include an implementation of a networking environment. Program modules 816 generally carry out the functions and/or methodologies of embodiments of the present disclosure, as described herein.

The computer system/server 800 can also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 can communicate with one or more networks such as a local area network (LAN), a general wide area network (WAN), and/or a public network (e.g., the Internet) via network adapter 822. As depicted, network adapter 822 can communicate with the other components of computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the system 700 for performance predictions in a computing cluster be attached to the bus system 806.

The descriptions of the various embodiments of the present disclosure have been presented for purposes of illustration, but are not intended to be exhaustive or limited to the embodiments disclosed. Many modifications and variations can be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present disclosure can be embodied as a system, a method, and/or a computer program product. The computer program product can include a computer readable storage medium (or media) having computer readable program instructions thereon for causing a processor to carry out aspects of the present disclosure.

The medium can be an electronic, magnetic, optical, electromagnetic, infrared or a semi-conductor system for a propagation medium. Examples of a computer-readable medium can include a semi-conductor or solid-state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present present disclosure can be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions can execute entirely on the user's computer, partly on the user's computer as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatuses, or another device to cause a series of operational operations to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It can also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the present disclosure. As used herein, the singular forms "a", "an" and "the" are intended to include the plural forms as well, unless the context clearly indicates otherwise. It can further be understood that the terms "comprises" and/or "comprising," when used in this specification, specify the presence of stated features, integers, operations, operations, elements, and/or components, but do not preclude the presence or addition of one or more other features, integers, operations, operations, elements, components, and/or groups thereof.

The corresponding structures, materials, acts, and equivalents of all means or operations plus function elements in the claims below are intended to include any structure, material, or act for performing the function in combination with other claimed elements, as specifically claimed. The description of the present disclosure has been presented for purposes of illustration and description, but is not intended to be exhaustive or limited to the present disclosure in the form disclosed. Many modifications and variations can be apparent to those of ordinary skills in the art without departing from the scope and spirit of the present disclosure. The embodiments are chosen and described in order to best explain the principles of the present disclosure and the practical application, and to enable others of ordinary skills in the art to understand the present disclosure for various embodiments with various modifications, as are suited to the particular use contemplated.

What is claimed is:

1. A method for performance predictions in a computing cluster, the method comprising:
   sampling and storing historic workload request data of the computing cluster as time-stamped workload values;
   forecasting an expected total number of workload requests for a defined future time interval based on a time-series analysis of the time-stamped workload values, wherein the time-series analysis detects cyclic and repeating events in the time-stamped workload values;
   in response to a result of the time-series analysis, training a workload prediction model by using additional data about acyclic events in expected workload requests, wherein the training applies a statistical regression technique for predicting a future workload demand for the computing cluster, wherein the workload prediction model comprises a machine learning model; and
   in response to exceeding a predefined threshold value of the predicted future workload demand, reassigning resources of the computing cluster.

2. The method according to claim 1, wherein the computing cluster is a z/Architecture based computing system.

3. The method according to claim 1, wherein the additional data comprises additional system information.

4. The method according to claim 1, wherein the computing cluster comprises a plurality of computing nodes.

5. The method according to claim 4, wherein one node of the computing cluster performs the time series analysis and the training for all other nodes of the computing cluster.

6. The method according to claim 1, wherein a workload request is characterizable by classes of workloads.

7. The method according to claim 6, wherein respective classes of workloads are selected from the group consisting of: online transactions, and batch workloads.

8. The method according to claim 1, wherein a number of workload requests is proportional to a number of transactions.

9. The method according to claim 1, wherein workload demand is proportional to a central processing unit utilization.

10. The method according to claim 1, wherein the statistical regression technique is based on the R statistical language.

11. The method according to claim 1, wherein the statistical regression technique comprises a Gradient Boosted Tree algorithm.

12. A system for performance predictions in a computing cluster, the system comprising:
    a processor; and
    a computer-readable storage medium storing program instructions configured to cause the processor to perform a method comprising:
       sampling and storing historic workload request data of the computing cluster as time-stamped workload values;
       forecasting an expected total number of workload requests for a defined future time interval based on a time-series analysis of the time-stamped workload values, wherein the time-series analysis detects cyclic and repeating events in the time-stamped workload values;
       in response to a result of the time-series analysis, training a workload prediction model by using additional data about acyclic events in expected workload requests, wherein the training applies a statistical regression technique for predicting a future workload demand for the computing cluster, wherein the workload prediction model comprises a machine learning model; and
       in response to exceeding a predefined threshold value of the predicted future workload demand, reassigning resources of the computing cluster.

13. The system according to claim 12, wherein the computing cluster is a z/Architecture based computing system.

14. The system according to claim 12, wherein the computing cluster comprises a plurality of computing nodes.

15. The system according to claim 14, wherein one node of the computing cluster performs the time series analysis and the training for all other nodes of the computing cluster.

16. The system according to claim 12, wherein a workload request is characterizable by classes of workloads.

17. The system according to claim 16, wherein respective classes of workloads are selected from the group consisting of: online transactions, and batch workloads.

18. The system according to claim 12, wherein a number of workload requests is proportional to a number of transactions, and wherein workload demand is proportional to a central processing unit utilization.

19. The system according to claim 12, wherein the statistical regression technique comprises a Gradient Boosted Tree algorithm.

20. A computer program product for performance predictions in a computing cluster, the computer program product comprising a computer readable storage medium having program instructions embodied therewith, the program instructions being executable by a processor to cause the processor to:

sample and store historic workload request data of the computing cluster as time-stamped workload values;

forecast an expected total number of workload requests for a defined future time interval based on a time-series analysis of the time-stamped workload values, wherein the time-series analysis detects cyclic and repeating events in the time-stamped workload values;

in response to a result of the time-series analysis, train a workload prediction model by using additional data about acyclic events in expected workload requests, wherein the training applies a statistical regression technique for predicting a future workload demand for the computing cluster, wherein the workload prediction model comprises a machine learning model; and in response to exceeding a predefined threshold value of the predicted future workload demand, reassign resources of the computing cluster.

\* \* \* \* \*